United States Patent [19]

Cheng

[11] Patent Number: 4,597,771
[45] Date of Patent: * Jul. 1, 1986

[54] FLUIDIZED BED REACTOR SYSTEM FOR INTEGRATED GASIFICATION

[76] Inventor: Shang-I Cheng, 17 Woodsend Dr., Matawan, N.J. 07747

[*] Notice: The portion of the term of this patent subsequent to May 15, 2001 has been disclaimed.

[21] Appl. No.: 595,948

[22] Filed: Apr. 2, 1984

[51] Int. Cl.[4] .............................................. C10J 3/56
[52] U.S. Cl. .......................................... 48/77; 48/73; 48/92; 48/111; 266/160
[58] Field of Search ................. 48/111, 99, 77, 73, 48/92; 266/160

[56] References Cited

U.S. PATENT DOCUMENTS

| | | | |
|---|---|---|---|
| 3,812,620 | 5/1974 | Titus et al. | 48/14 |
| 3,847,563 | 11/1974 | Archer et al. | 48/77 |
| 4,026,679 | 5/1977 | Collin | 48/73 |
| 4,152,122 | 5/1979 | Feldmann | 48/111 |
| 4,231,760 | 11/1980 | Lancet et al. | 48/202 |
| 4,353,713 | 10/1982 | Cheng | 48/202 |
| 4,448,588 | 5/1984 | Cheng | 48/111 |

Primary Examiner—Peter Kratz
Attorney, Agent, or Firm—Karl F. Ross; Herbert Dubno

[57] ABSTRACT

An integrated gasifying apparatus for solid municipal waste, sewage sludge and coal utilizes a fluidized-bed gasifier from which the char enters a low-temperature fluid bed combustor and then a high-temperature fluid bed combuster. CaO is admitted to the gasifier to form part of the bed and calcined lime is carried out of the high temperature combustor. The product gases are separated to recover $CO_2$ which is recirculated to the gasifier at least in part as a fluidizing gas.

11 Claims, 9 Drawing Figures

FLUIDIZED BED REACTOR SYSTEM FOR INTEGRATED GASIFICATION

CROSS REFERENCE TO RELATED APPLICATIONS

This application is related to my copending application Ser. No. 370,055 filed Apr. 20, 1982 (now U.S. Pat. No. 4,448,585) as a division of my then pending application Ser. No. 173,169 filed July 28, 1980 (now U.S. Pat. No. 4,353,713 of Oct. 12, 1982).

FIELD OF THE INVENTION

My present invention relates to a fluidized bed reactor system in the integrated gasification of coal, municipal solid wastes, biomass and/or sludges produced in the treatment of sewage and/or in the destruction of toxic wastes.

BACKGROUND OF THE INVENTION

With the declining availability of energy sources and increasing concern for environmental contamination by municipal solid waste (MSW) and sewage-treatment sludges, a number of proposals have been made which will, on the one hand be capable of converting MSW to useful energy and destroying or eliminating the sludge disposal problem.

It has long been recognized, in addition, that the only long-term economically available energy source currently exploitable in the United States is coal which can be utilized with great effectiveness upon gasification.

It should also be noted that incineration of sludge and MSW produces atmospheric pollutants and hence this technique is not a solution to environmental problems.

In practice it has been found that coal gasification, being an endothermic process, is frequently uneconomical and that conventional techniques for the gasification of MSW and sludge, likewise are unsatisfactory.

A process which can gasify coal, municipal solid waste and sludge integratedly in an optimal way is the subject of my U.S. Pat. No. 4,353,713. In application Ser. No. 370,055 I describe a specific apparatus for carrying out this process.

OBJECTS OF THE INVENTION

It is the principal object of my present invention to provide an improved installation for the integrated gasification of coal alone, or the integrated gasification of coal, MSW, sludge and/or other biomasses and for the destruction of toxic wastes extending the principles of my earlier applications and whereby the disadvantages of prior art systems can be obviated.

It is another object of this invention to provide an improved system for the gasification of coal which is more economical than earlier systems, which in general, treat the feed materials separately, and at the same time, can eliminate potential environmental hazards from the disposal of municipal solid waste and sewage treatment sludge.

It is also an object of my invention to provide an improved apparatus for the elimination of MSW and sewage treatment sludge so as to obtain optimum utilization of both the energy content and the recoverable components thereof.

SUMMARY OF THE INVENTION

These objects and others which will become apparent hereinafter are attained, in accordance with the present invention, in a system which is based upon the contribution to the gasification step of the exothermic reaction $CaO + CO_2 = CaCO_3$ and which utilizes gasifier and combustor units constituting fluidized-bed reactors.

As will be developed hereinafter, it has already been proposed to provide a $CO_2$ acceptor process in which, however, the drying of the coal prior to gasification creates such an energy demand as to make this system uneconomical.

I have found that large quantities of heat can be generated in the gasifier or during a gasifying stage by recovering carbon dioxide from the flue gas of a later stage in the process, e.g. from the flue gases or product gases, and feeding this carbon dioxide back (i.e. recycling it) to the gasifier to raise the partial pressure therein at the point at which the carbon dioxide reacts with the CaO, in the form of calcined lime or dolomite, in the exothermic reaction described above.

Surprisingly, municipal solid waste (MSW) and coal can be jointly gasified with the heat contributed by this exothermic reaction (using $CO_2$ produced by pyrolysis of MSW and combustion of coal) with considerable efficiency to produce a gas mixture capable of separation as described below and char which can be induced to undergo a water gas reaction downstream from the initial gasifier phase and preferably in the same unit of the installation, this second gasification phase using heat contributed by the exothermic reaction between recycled $CO_2$ and CaO.

According to the invention, the water for the water gas reaction is preferably supplied by preheated sludge, thereby integrating coal gasification and disposal of MSW and sludge into an energetically efficient process which is capable of producing economically valuable substances such as synthesis or combustible gases (fuel gases), carbon dioxide and reusable municipal waste residues such as molten aluminum.

In order to reduce the need for frequent cleaning of the heat-exchange equipment for preheating the sludge, the suspended solids in the sludge are removed by a filter in which ground coal particles are in counter-current flow with the sludge.

Naturally, it is not always essential to utilize MSW as a carbon-containing substance in addition to coal or even to use sewage-treatment sludge as a water carrier if the water contribution is supplied from some other source. However in the preferred operation, the feed to the process will consist of coal and at least one component selected from the group which consists of municipal solid wastes, biomass from fermentation or from growth-producing processes or natural water. Water is always required and will be supplied as moisture in one or more of the aforementioned components, preferably as part of the sludge composition. The $CaO/CaCO_3$, as lime or dolomite, is of course recycled.

According to the broadest principles of the present invention, at least one carbon-containing substance (preferably three carbon-containing components as noted above) is gasified in the presence of CaO at an elevated temperature with at least part of the heat necessary for the gasification deriving from the reaction of CaO with $CO_2$ to form $CaCO_3$, thereby producing a solid residue containing $CaCO_3$ and a gas containing carbon dioxide, hydrogen, carbon monoxide, $H_2O$ and hydrocarbons.

The reaction system can include toxic wastes such as PCB's or dioxins which are economically decomposed with acid residues being trapped in the alkaline solids in the combustor reactors.

The solid residue of this first stage of the process also includes calcined lime or dolomite which has not yet reacted with carbon dioxide.

It should be noted that the process of devolatilization of coal during the beginning stage of gasification is almost thermal neutral. Under slightly endothermic conditions, the heat required is supplied by the reaction of part of the hot CaO (in the form of recirculated calcined lime or dolomite), and carbon dioxide generated by the devolatilization of the coal.

In the second stage of the reaction, the residual char is reacted with $H_2O$ in a steam-carbon water gas reaction which is highly endothermic, the major part at least of the heat required for this reaction being contributed by the highly exothermic reaction of CaO in the solids with $CO_2$ in the gas at the high $CO_2$ vapor pressure maintained during these first two phases.

During the first stage or phase, organic components in the MSW, where the latter constitutes one of the feeds, are pyrolyzed.

It will be apparent from the foregoing that the second stage of the reaction is again a gasification, namely the gasification of the residual char. The reaction is enabled to occur by supplying a large quantity of heat in the form of carbonization of the lime or dolomite with recycled $CO_2$ being derived from the flue gas and product purification stages as described below.

Since the $H_2O$ generated in the first stage by pyrolysis and devolatilization is not sufficient to sustain the steam/char reaction in the second stage, additional water is supplied. According to an important feature of the invention, the additional water is supplied by wet biomass or sludge and any moisture which may be present in the coal, e.g. by the use of a coal having a high concentration of moisture such as lignite. The biomass and the sludge contribute organic components which likewise undergo gasification by the char/steam reaction, thereby contributing to the gas production and simultaneously disposing of the biomass and the sludge without leaving any significant waste in the liquid or solid form.

During the second stage of the reaction, various inorganic residues may be thermally treated in the gasification unit. For example, municipal solid waste may contain aluminum which was not previously removed as were ferrous metals, glass and the like. At the temperatures of the gasification reactor during one or both of the gasification stages, an aluminum melt can form and can be recovered.

The products of the second stage reaction include a solid phase consisting predominantly of calcium carbonate or $CaCO_3.MgO$ or $CaCO_3.MgCO_3$, and a gas phase containing carbon dioxide, carbon monoxide, hydrogen, residual water vapor and hydrocarbons.

According to a feature of the invention, in the third stage, carbon dioxide is removed from the gas produced in the second stage, i.e. the excess carbon dioxide which remains unreacted, and this excess carbon dioxide is at least in part recycled to the second stage to provide the high carbon dioxide vapor pressure therein. This carbon dioxide may be delivered to the first stage wherein only a portion reacts with the CaO, the remainder proceeding to the second stage.

According to an important aspect of the invention, the second stage reaction is only carried out to a point which ensures that some char remains in the solid residue. This solid residue is thus combustible and, in a fourth stage of the system of the present invention, is subjected to combustion in a series of fluid-bed combustors separate from the fluidized-bed gasifiers. The combustion in the latter stage is carried out with air or oxygen-enriched air and under such circumstances that the heat generated by combustion is in excess of that required for the complete decomposition of the $CaCO_3$ in the solid residue by the reaction: $CaCO_3 = CO_2 + H_2O$. The remaining char is thus fully utilized as fuel for the decomposition reaction of which the products include a hot solid phase consisting of calcined lime or dolomite and a gaseous phase (flue gas) which consists of combustion products and $CO_2$ released by the calcination of the solid residue.

The CaO produced in the fluidized-bed combustors is recycled to the gasification stage and at least a part of the $CO_2$ from the flue gas can be recovered and recycled to the gasification stage to produce the high carbon dioxide vapor pressure in the gasifiers.

The product gas of the entire process is the mixture of gas components or the individual components having a fuel value from the second stage gasification, i.e. after removal of carbon dioxide. The product gas can be treated further to yield a mixture which consists almost exclusively of hydrogen, methane and higher hydrocarbons.

According to another feature of the invention, the municipal solid waste, when used as a component of the first or second stage gasification, is subjected to a separation preferably to distinguish between a light component and the remainder of the comminuted mass, the light component being combined with the coal and fed therewith to the first stage gasification. All or part of the MSW fraction can be replaced by agricultural wastes, e.g. cellulosic or other fiber material resulting from cereal production, and from any growth-producing process.

In yet another feature of the invention, the water source e.g. biomass or sludge, is preheated in direct heat exchange with flue gases from the combustor and/or the gases produced in the second gasification stage by the reaction of char with steam preferably prior to the removal of carbon dioxide from the latter gases.

The flue gas may be scrubbed with an absorbent for $CO_2$ and from which the $CO_2$ is desorbed. The gas after absorption of $CO_2$ has been found to be excellent for ammonia synthesis and can be delivered directly to an ammonia synthesis plant while the desorbed $CO_2$ can at least in part be liquefied and utilized for tertiary petroleum recovery, e.g. by injection into partially depleted oil strata to promote recovery therefrom.

One of the principal advantages of the system of the present invention is that it simultaneously eliminates sulfur and sulfur compounds from the gases produced from the coal. Any sulfur or sulfur compounds originally contained in the coal are transformed to $H_2S$ or other sulfur compounds, and are captured by the CaO and thereby removed from the gases resulting from the second stage char/steam reaction. According to the invention the $H_2S$ is recovered collected and fed to a Claus process.

In order to save energy for compression of $CO_2$ for the fluidization of gasifier and to support the $CO_2$-lime reaction, an expander is attached to the compressor. Part of the energy required for the compression is supplied by expanding the product gases leaving the gasifier. Lowering of the pressure of product gases facili-

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
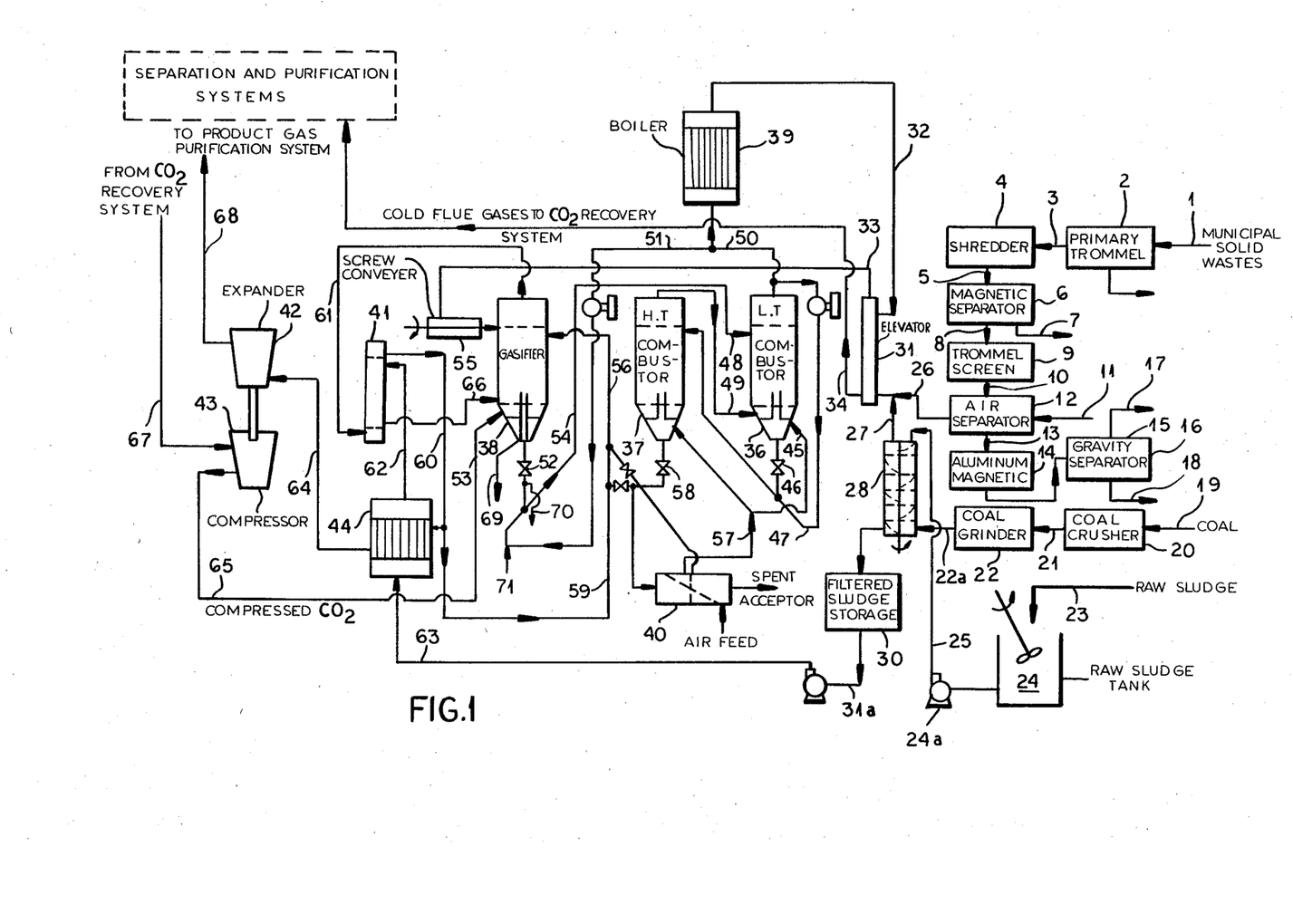
FIG. 1 is a flow diagram of an apparatus for carrying out the method of the invention.

As can be seen from FIG. 1, municipal solid wastes or agricultural wastes indicated by stream 1 are fed into a primary trommel 2 to separate large and heavy objects, and the less heavy and smaller materials are passed via stream 3 into a shredder 4 where the garbage is broken into sizes of around 1 to 4 inches.

The shredded wastes are fed via stream 5 into a magnetic separator 6 where ferrous metals are separated from combustible materials and non-ferrous metals. The combustible materials and non-ferrous metals pass via stream 8 into the second trommel screen 9 again to separate out heavy objects. The ferrous metals are discharged as stream 7 for further disposal.

The lighter materials leave the trommel via stream 10 and enter air separator 12 where papers and shredded aluminum foils are lifted into the air stream 11.

The heavier materials leave as stream 13 and pass into an aluminum magnetic separator 14 where heavier aluminum particles and aluminum alloys are separated from non-ferrous metals, residual ferrous metals, rocks and dirt. The latter enter via stream 15 into a gravity separator 16 where non-ferrous materials 18 are separated from the rest 17 of the materials.

Coals ranging in type from lignite to sub-bituminous, caking or non-caking, are admitted via stream 19 and crushed at 20. The crushed coals are fed later via stream 21 into a grinder 22 where they are ground to an average size of about ⅛ inch. Final choice of coal particles size should be an optimal balance between rate of gasification and cost of grinding. The ground coal enters via 22a into the bottom of a sludge filter 28 which is equipped with an up-lifting screw conveyor which moves coal particles from the bottom to the top of the filter.

Raw sludge enters the plant via stream 23. It is stored in the raw sludge tank 24. The sludge is continuously pumped via pump 24a and stream 25 into the top of the conveyor-filter 28 in which the sludge trickles down counter-currently with the up-flow coal particles. Most of the suspended solids in the sludge are retained on the coal particles. The filtered sludge goes into a storage tank 30 and is displaced by a pump from stream 31a into the preheater 44 via line 63. In the preheater the sludge is heated by product gases leaving the heater 41. The heated sludge finally is fed via line 62 into gasifier 38.

The granular coal covered with solids from sludge leaves the filter 28 as stream 27 which is combined with the combustible solid waste (with some light aluminum foil) from the air separator (stream 26) and these solids can be lifted in the elevator 31 where they are dried and preheated by flowing counter to flue gases from the waste heat boiler 39. The solids are fed via line 33 into the gasifier 38 through a screw conveyor 55 or a rotary hook-type solid feeder (Chemical Engineering Progress, May 1983). The hot calcined lime or dolomite coming from the bottom of the high temperature combustor 37 (line 56) is injected into the gasifier 38 by a stream of product gases (or compressed $CO_2$). The char leaves the gasifier through a valve 52 and is introduced into the low-temperature combustor 36.

The char from the gasifier 38 is reacted in the low-temperature combustor 36 with flue gas (line 45) containing excess oxygen and coming originally from the high temperature combustor 37. Controlled amounts of additional air are admitted into combustor 36 so that the flue gases from 36 are in neutral or slightly reducing condition to minimize the formation of nitrogen oxides. The partially burned char leaves the bottom of combustor 36 through a valve 46 and is injected into high temperature combustor 37 by a recycled part of the flue gases from the low-temperature combustor 36. The flue gases produced in the latter are sent to a waste boiler 39 then to the elevator 31 to preheat the solid feed. From the elevator 31, the flue gases pass via stream 34 to the purification system for $CO_2$ recovery. The hot product gases are used to preheat the sludge in heat exchangers 41 and 44. When the gasifier is operated under pressure, the products leave preheater 44 via line 64 and enter an expander 42. To recover its energy content, a compressor 43 is attached to the expander. The power recovered is used for compression and heating of $CO_2$ gas which is then fed via line 65 into the gasifier as stream 53. Part of the hot and calcined $CO_2$ acceptor (lime or dolomite) which contains no residual combustible material is continuously withdrawn from the conical shaped collection chamber at the bottom of the comustor 37.

In the acceptor-slag separator 40 the acceptor and slag mixture is cooled by air. It is preferable to use two separators in series. In the first separator, very hot receptor-slag leaving the combustor 37 via line 58 enters the separator and goes into the inside of a perforated rotary drum. The mixture moves counter currently with the hot air from the second separator. The mixture is cooled slightly below the solidification point of the slag. As the slag agglomerates into large chunks, it remains in the inside of the drum, while the $CO_2$ acceptor is still in powder form, passing through the perforations into the bottom of the outside case of the separator. The slag and acceptor are moved through the separator either by gravity or by screw conveyors located at the bottom of the drum and the outside shell of the separator. The rates of flow are controlled by the inclination of the separator. Emerging from the first separator, the stream is divided into two streams, the main stream is lifted by flue gas stream 59 and is recycled as stream 56 into the gasifier 38. The minor acceptor stream (not shown) serving as a purge for the system after preliminary cooling enters into the separator where it is in counter-current flow with cold air. The agglomerated glass is separated from the spend acceptor. The hot air from the first separator is sent into the combustor.

The integrated gasification plant consists of two or more combustors in series. As the partially gasified chars go through the series, the temperatures of combustors are progressively increased. The temperature is the highest at the combustor where the chars are burned virtually of all their combustible content. It could reach about 2400° F. when air is used. When oxygen-enriched air or pure oxygen is , it could reach close to 3000° C. and the combustor can be used to incinerate toxic wastes (e.g. PCBs and dioxin) the gasifier 38 is provided at its bottom with an outlet 70 to enable withdrawal of all or part of outgoing Char—$CaCO_3$—CaO—CaS mixture for transfer to a sulfur recovery system. The resultings Char—CaO—$CaCO_3$ mixture may be returned at an inlet 71.

DETAILED DESCRIPTION OF FLUIDIZED BED REACTOR AND ACCEPTOR-SLAG SEPARATORS

Figure 3A:
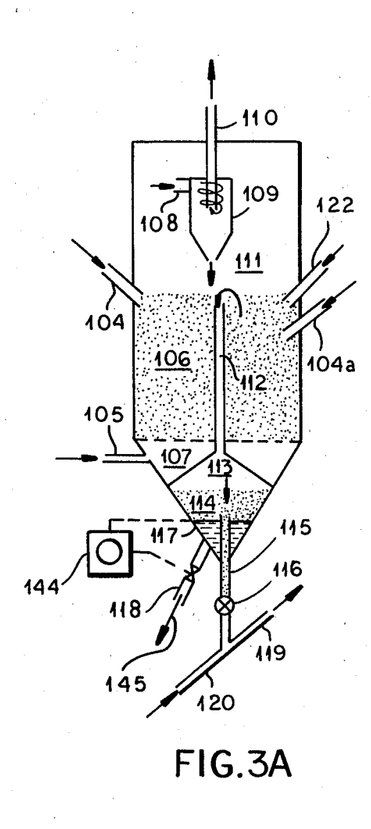
FIGS. 3A–3C are vertical sections of the combustor, the gasifier and the acceptor-slag separator, respectively.
Figure 3B:
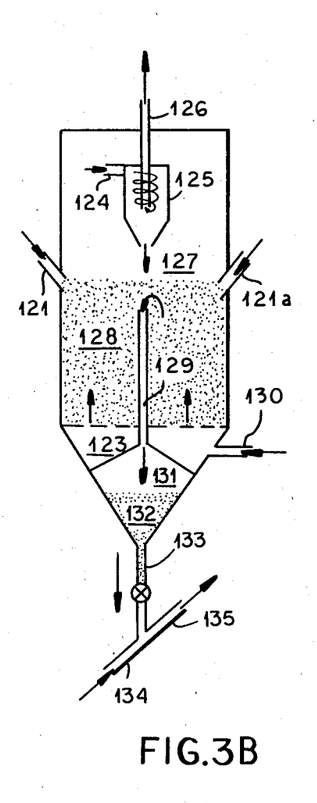

As shown in FIG. 3B, the combustor 36 or 37 can comprise a cylindrical body and a conical bottom 131, the bed is fluidized by passing air or oxygen entering 130, into the last combustor (where the temperature is highest) through a gas distributor 123 (made of sintered steel or of the nozzle type commonly utilized for the fluidized combustion of coal or low grade solid fuels). The char enters the fluidized bed 128 through inlet 121. The char particles and air form a fluid-like combustion mixture 128. Part of the particles flow into the chamber 131 via down-pipe 129. Completely or partially burned chars mixed with acceptor in chamber 131 settle down to the bottom 132 where they are continuously withdrawn via valve 133 by a jet stream of flue gas 134 and go as stream 135 into the next combustor with higher bed temperature or go into the acceptor-slag separator for the last combustor in which the bed temperature is the highest. The flue gases go into a cyclone 125, at the inlet 124. The entrained particles are separated and back to the fluidized bed via 127. The flue gases leave the combustor at 126.

When the last combustor which has the highest reaction temperature serves to dispose toxic wastes such as PCB, or materials which can form dioxin, through incomplete combustion, they enter at 121a in the form of liquid or grinded solids. Preheated air or oxygen-enriched air enters at 130. The byproducts of certain chlorine containing compounds such as hydrochloric acid or chlorine gas is neutralized by lime or calcined dolomite and the reaction products are retained in the solid phase.

Figure 2:
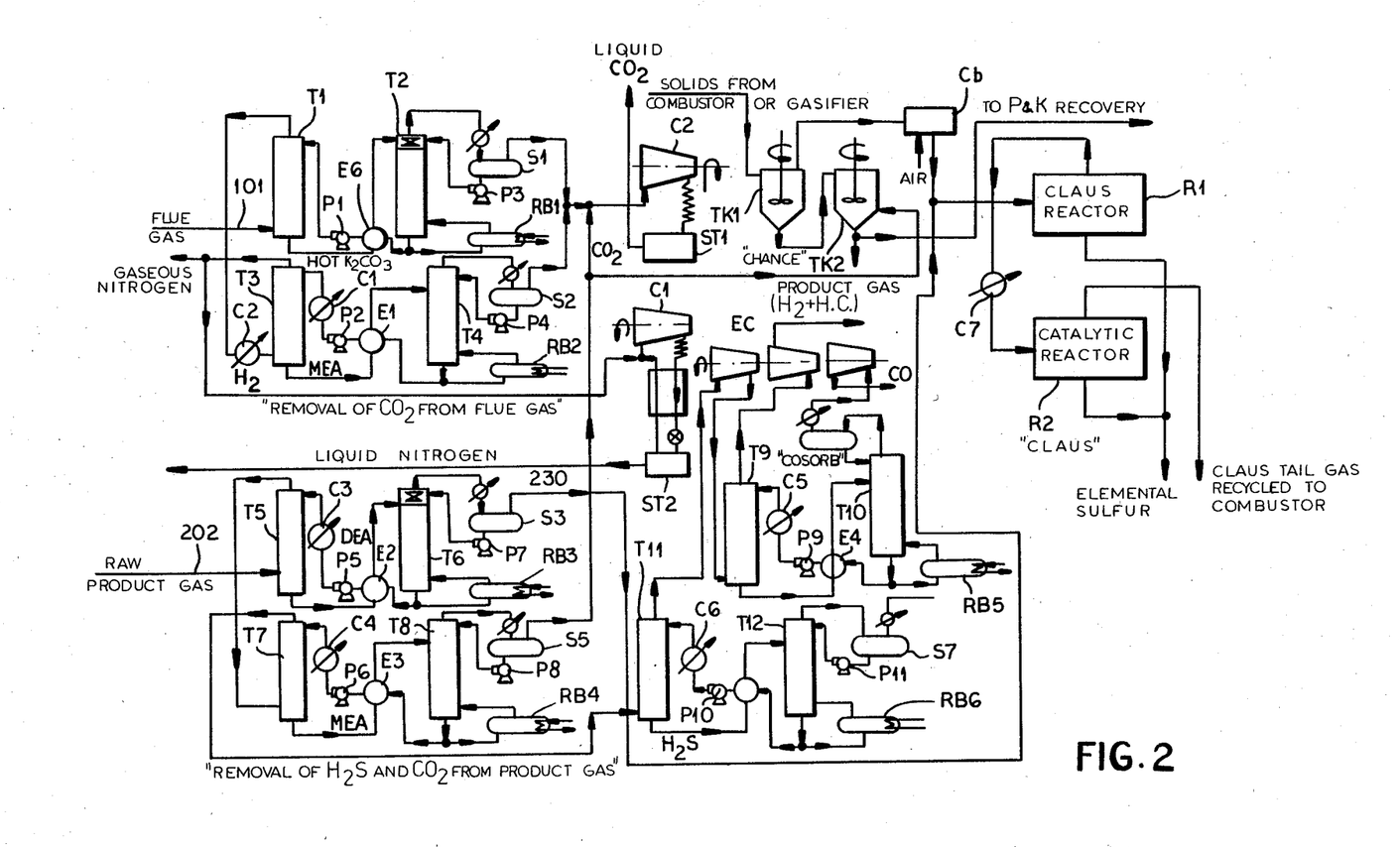
FIG. 2 is a flow diagram showing purification and separation stages for product gases and recycling carbon dioxide gas.

SYSTEM OF GAS PURIFICATION AND BYPRODUCT RECOVERY (FIG. 2)

The flue gas stream 101 enters absorber T1 where 98% of the $CO_2$ is removed by an aqueous solution of $K_2CO_3$ (30 to 40% by weight) at about 280° C. in absorber T2 to reduce the $CO_2$ content of the flue gas to 10-25 ppm leaving the latter essentially as pure nitrogen. Rich $K_2CO_3$ and MEA solutions are regenerated by heating in the heat exchanger E6 and E3 and stripping in towers T2 and T4 respectively.

The product gas from the gasifier comes into the purification section as stream 2. It is first scrubbed with diethylamine (DEA) to remove all $H_2S$ together with a small amount of $CO_2$ in tower T5. The rich DEA solution is preheated in heat exchanger E2 and stripped of its gas content in tower T6. The gas (mainly $H_2S$) separates from rich DEA solution in storage tank S3 and leaves as stream 230 which is led to Claus process section for sulfur recovery.

After being stripped of its $H_2S$ content, the product gas is depleted of its $CO_2$ content down to 10-25 ppm by scrubbing with aqueous solution of MEA in tower T7. The rich MEA solution is regenerated in tower T8. The $CO_2$ gas from storage tank S5 is combined with $CO_2$ recovered from the flue gas for further processing.

Now, the product contains only hydrogen, CO, $CH_4$ and some other hydrocarbons. It is first dried by scrubbing with diethylene glycol (DEG) in tower T11. The DEG stream 41 is regenerated in stripping tower T12. The water vapor is purged as stream 49. Then the product gas stream 40 is led into the COSORB process section where the gas mixture is compressed by an expander-compressor, EC, to several atmospheres. Then it is scrubbed with a toluene solution of cuprous aluminum tetrachloride in tower T9. The scrubbing solution is regenerated in tower T10. Both product gas (now contains only hydrogen and lower hydrocarbons) and pure CO pass through the expander. Both gases have a variety of uses.

Both $CO_2$ and nitrogen are liquefied for transport to remote destinations. If an ammonia synthesis plant is located nearby, the nitrogen can be pipelined to the plant site. The spent lime or dolomite is continuously purged from the combustor.

This system is otherwise of the type described in the above-identified applications.

GASIFIER

As shown in FIG. 3A, the gasifier contains the same essential elements as the combustor except in the bottom chamber, 113 arrangements are made to facilitate the separation of molten aluminum. The coal and municipal solid wastes enter at 104, the $CO_2$ acceptor enters at 22, and the preheated sludge enters at 104a. The compressed $CO_2$ gas enters at 105, and then through the distributor and it fluidizes the gasifying bed 106. The product gases go into the cyclone 109 via the entrance 108. The entrained particles are separated from gases and back into the bed via 111. The gases leave the gasifier at exit 110. In the bottom separating chamber, the outgoing pipe 114 connecting to the valve 16 is protruded upward into the middle of chamber 113. The molten aluminum is accumulated at the bottom of the chamber 113 and its withdrawal is controlled by a level recording controller 144 via a valve 118 as stream 145 into ingot casting device (not shown). A screen is located at 117 to prevent the mixing of the foreign solid particles from entering the outgoing molten aluminum.

ACCEPTOR-SLAG SEPARATOR

Figure 3C:
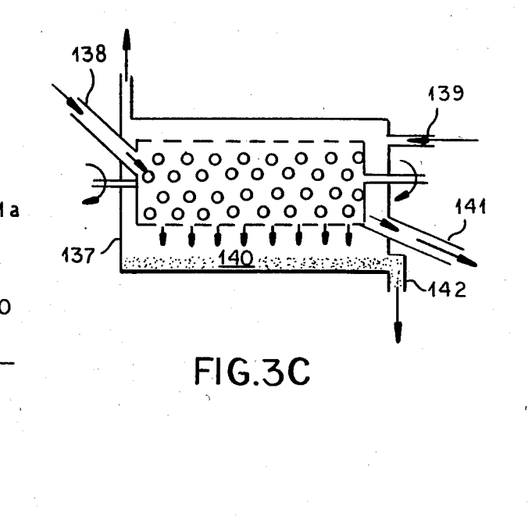

As shown in FIG. 3c acceptor-fused slag enters the input 137 at 138 and it is in countercurrent flow with air delivered at 139. As it cools, the slag solidifies and agglomerates into chunks which are retained in the inside of the drum and go out through exit 141, whereas powdered acceptor passes through the perforations and leaves the equipment at the exit 142.

SPECIFIC EXAMPLE

The composition of raw materials used for the integrated process shown in Table I.

TABLE I
Raw Material Compositions

| Pittsburgh Seam hvAb Coal | | Municipal Solid Waste | | Municipal Sludge | |
|---|---|---|---|---|---|
| A. Proximate Analysis: | | Heating value = 5500 BTU/lb | | 3% dry solid content | |
| Moisture | 1.2% | Moisture | 18.35% | Heat value of undigested solid for volatiles = 10,300 BTU/lb [9] (vs. 5300 BTU/lb for digested solid) | |
| Volatile matter | 36.4 | Combustible | 65.32% | | |
| Fixed carbon | 56.7 | Inorganic | 16.33% | | |
| Ash | 5.7 | | | | |
| B. Ultimate Analysis: | | Composition of Inorganics: | | Dry solid analysis: | |
| Carbon | 79.09% | Glass | 38.4% | [10] | |
| Hydrogen | 5.22 | Rock and dirt | 28.9 | Volatiles | 44.2 |
| Nitrogen | 1.60 | Ferrous | 26.9 | Ash | 55.8 |
| Sulfur | 1.10 | Metals | | Analysis of Ash: | |
| Oxygen (by difference) | 7.22 | Aluminum | 3.9 | $SiO_2$ | 48.1% |
| | | Non-ferrous Metals | 1.9 | $Al_2O_3$ | 13.1 |
| Ash | 5.77 | | | CaO | 21.7 |
| Total | 100% | Ultimate Analysis: | | MgO | 2.1 |
| | | $H_2O$ | 18.4% | $K_3PO_4$ | 12.4 |
| | | Ash | 16.3 | Sulphate | 1.0 |
| | | C | 36.5 | $Fe_2O_3$ | 8.8 |
| | | H | 4.5 | MnO | 0.3 |
| | | O | 24.2 | $P_bO$ | 0.3 |
| | | N | 0.03 | | |
| | | S | 0.07 | | |
| | | | 100% | | |
| | | Proximate Analysis: | | | |
| | | Moisture | 18.4% | | |
| | | Fixed Carbon | 27.7 | | |
| | | Volatile Matter | 37.6 | | |
| | | Ash | 16.3 | | |

100 lbs/hr of municipal solid waste and 108.9 lbs/hr of Pittsburgh seam hvAb and 83.3 lbs/hr of sludge with 97% water content were cogasified. The compositions of the three raw materials are shown in Table I. The calcined lime was circulated at a rate of 325 lbs/hr (40% excess). The gasifier was operated in the temperature range of 1200° F. to 1800° F. The solid exit end of the combustor was operated at 2000° to 2400°. The air used was varied from stoichiometric values to about 15% excess in oxygen. Approximately the following products were obtained:

| Carbon monoxide gas | $5.76 \times 10^4$ cu. ft/day |
|---|---|
| Carbon dioxide | 2270 lbs/day |
| Product gas | $8.1 \times 10^4$ cu. ft/day |
| Product gas composition | $H_2$, 87.2%; $CH_4$, 7.6%; $C_2$-$C_3$, 5.2% |
| Product gas heating value | 400–420 BTU/lb |
| Char, none | |
| Sulfur | 26 lbs/day |
| Aluminum and its alloy | 13 lbs/day |
| Ferrous metals | 95 lbs/day |
| Non-ferrous metals | 6 lbs/day |
| $NH_4CO_3$ | 170 lbs/day |
| Phosphates | 3.3 lbs/day |

When economics permits, more than two fluidized-bed reactors may be used as combustors in series to fully achieve the counter-current principle. The carbonized lime or dolomite with residual chars enter the combustor with the lowest temperature where the char is completely burned. The fresh preheated air enters the combustor with the highest temperature and move in countercurrent with the char-lime (or dolomite) mixture, and finally the flue gases leave the combustor train from the combustor with the lowest operating temperature.

In order to facilitate the process control, the functions of the gasifier can be achieved by two fluidized bed reactors. One of the two reactors serves as a pyrolyzer where MSW and coal meet with hot calcined lime (or dolomite). The sensitive heat of the latter and some of the heat of carbonization of lime serves to volatilize the volatile matters of the MSW and coal. The aluminum separation compartment is provided with this reactor. To it no steam is admitted. Whileas in the second reactor the char-steam reaction is being carried out. High temperature steam is admitted, and large quantity of recycled $CO_2$ is continuously pumped in as fluidization agent. The advantage of using two gasifiers is that the operating conditions for each can be tailored to suit a particular reaction, one for pyrolyzation, another for gasification proper.

Figures 4A, 4B:
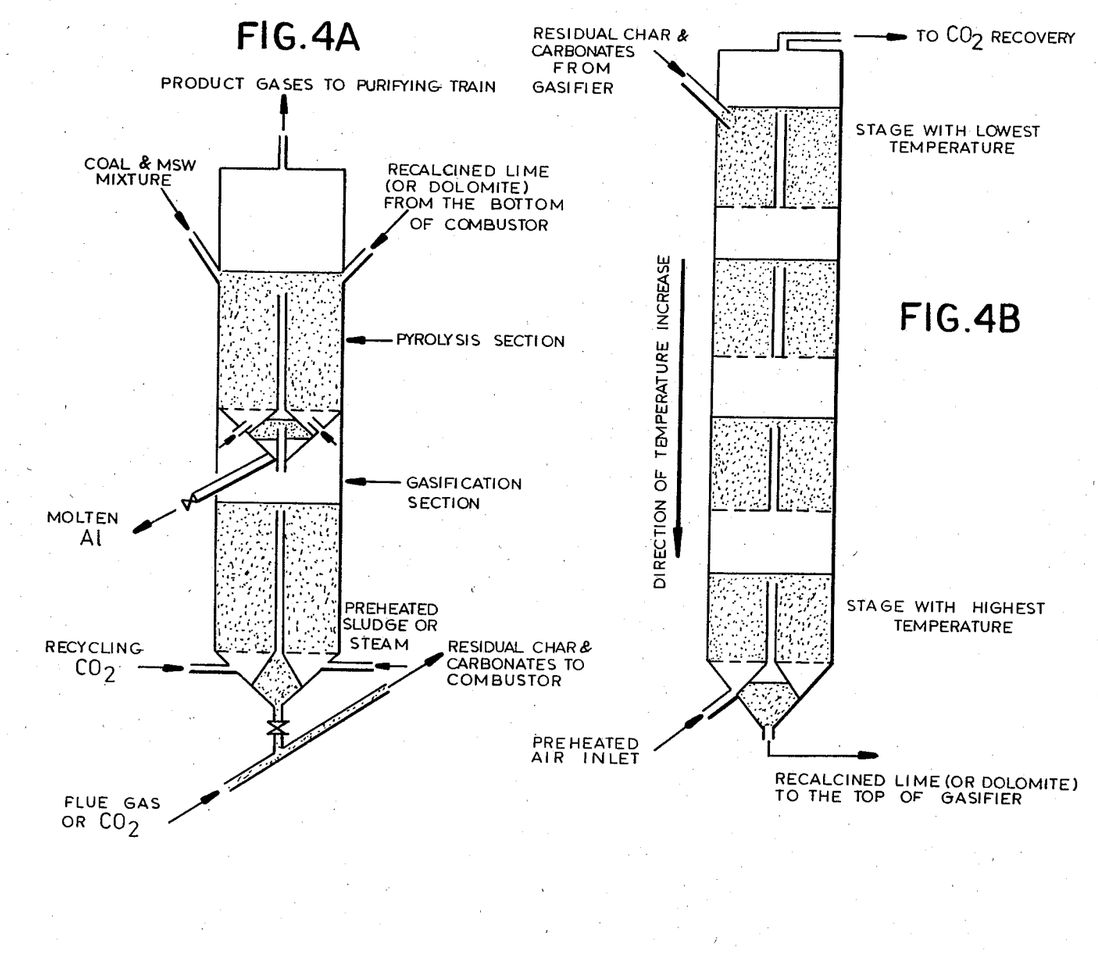
FIGS. 4A is a diagrammatic section showing a multiple-stage vertical cascade gasifier which can be utilized in pairs of the single stage gasifier of FIG. 1.
FIG. 4B is a vertical section of a multiple-stage vertical cascade combustor operating in a countercurrent mode which can be utilized as the combustor for either high-temperature or low-temperature combustion in the system of FIG. 1.

In FIG. 4A I have shown a multiple-stage fluidized bed gasifier in the form of a vertical cascade in which a gasification section is located below a pyrolysis section or that the cascade can be utilized in pairs of the gasifier 38 of FIG. 1.

Similarly, either combustors 37 or 36 can be replaced by the vertical cascade shown in FIG. 4B through which the calcined lime or dolomite can pass in counterflow (downwardly) while the air is fed upwardly and the char moves downwardly from the gasifier.

Figure 5A:
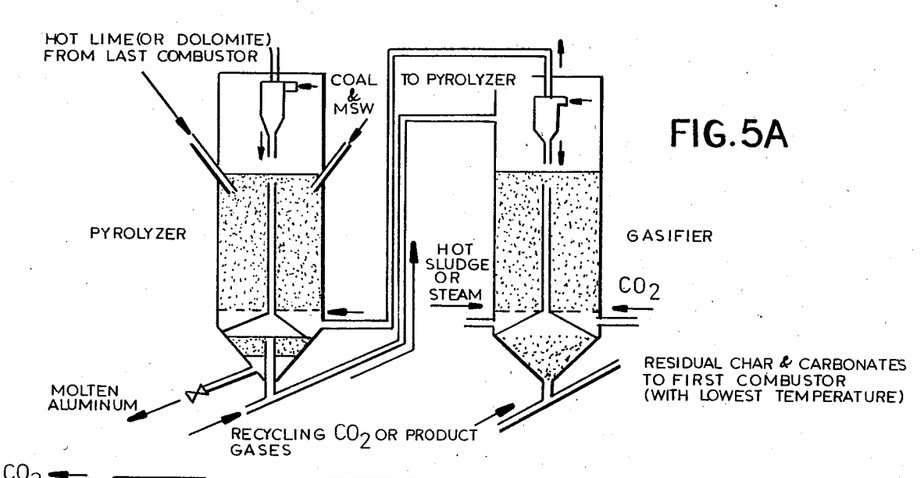
FIG. 5A is a diagrammatic section through a battery of reactors forming a horizontal cascade constituting a pyrolyzer-gasifier pair for use in pairs of the single gasifier stage in FIG. 1.
Figure 5B:
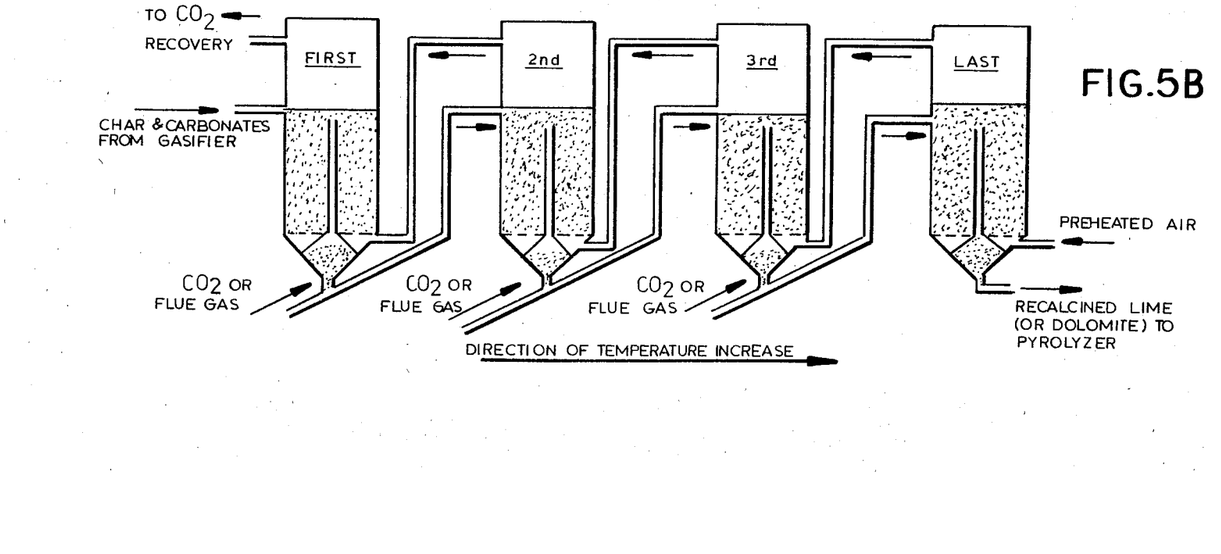
FIG. 5B is a diagram showing a cascade of 4 combustor stages which can be substituted for either of the combustors shown in FIG. 1.

FIG. 5A and 5B show similarly functioning units wherein, however, as far as the gasifier is concerned a horizontal cascade of pyrolyzer and gasifier are provided (FIG. 5A). A series of combustors in cascade is shown in FIG. 5B to be substituted for the combustors 36 or 37 with similar functioning. Thus, both the multiple-stage gasifier and the multiple-stage combustor can be either in the form of vertical cascades or a horizontal battery of such units.

I claim:

1. A gasification apparatus which comprises:

a fluid bed gasifier including an upright fluid-bed chamber, means for introducing a fluidizing gas into said chamber at a bottom portion thereof, said gasifier having a conical bottom containing a molten aluminum pool and a layer of char above said pool, a pipe extending upwardly through said pool above the surface thereof for the continuous withdrawal of char from said gasifier, means below the upper end of said pipe for tapping said pool, and three feed ports respectively for introducing CaO, sludge and a combination of comminuted coal and shredded municipal waste for gasifying said comminuted coal, sludge and shredded municipal waste in the presence of hot CaO to produce a char and a product gas, and means for discharging said char and means for discharge said product gas;

a low-temperature fluid bed combustor means connected to said gasifier and receiving said char therefrom and provided with means for feeding a flue gas to the combustor for reacting said char with a flue gas containing air to produce an output gas and a partially burned char;

a high-temperature fluid bed combustor means connected to said low-temperature fluid bed combustor and receiving said partially burned char therefrom for fully burning same to produce said flue gas and a solid product rich in CaO;

a separator connected to said high-temperature fluid-bed combustor receiving said solid product for separating hot CaO from slag and supplying said hot CaO to said gasifier;

separation and purification means receiving said output gas and recovering $CO_2$ therefrom; and means for feeding the recovered $CO_2$ as said fluidizing gas to said gasifier.

2. The apparatus defined in claim 1 wherein said means for feeding said recovered $CO_2$ includes an expansion turbine connected to at least one of the fluid beds and driven by gas produced therein, and a compressor connected to said turbine for compressing said recovery $CO_2$ before it is fed to said gasifier.

3. The apparatus defined in claim 1 wherein said means below the upper end of said pipe includes an aluminum withdrawal valve, said gasifier being provided with a level-responsive controller monitoring said pool for controlling said valve.

4. The apparatus defined in claim 1, further comprising means for introducing a toxic waste into said high-temperature combustor.

5. The apparatus defined in claim 1, further comprising a sludge filter for passing said sewage sludge in intimate contact with said comminuted coal before admitting said comminuted coal to said gasifier.

6. The apparatus defined in claim 5 wherein said sludge filter comprises an upright vessel, means for passing said sludge downwardly through said vessel, and a screw conveyor having blades in said vessel for displacing the comminuted coal upwardly therein in counterflow to the sludge.

7. The apparatus defined in claim 6, further comprising a preheater for heating said sludge between said filter and said gasifier with a gas from one of said combustors, and then admitting preheated sludge to said gasifier.

8. The apparatus defined in claim 1 wherein a plurality of combustors are provided between said low-temperature combustor and said high temperature combustor for the smooth combustion of char and decomposition of $CaCO_3$ on a counter-current principle.

9. The apparatus defined in claim 8, further comprising a waste heat boiler receiving said output gas and cooling same.

10. The apparatus defined in claim 9, further comprising means for preheating said coal with said output gas before admitting said coal to said gasifier.

11. The apparatus defined in claim 10 wherein said means for feeding said recovered $CO_2$ includes an expansion turbine connected to one of said fluid beds and driven by gas produced in said one of the fluid beds, and a compressor connected to said turbine for compressing said recovered $CO_2$ before it is fed to said gasifier.

* * * * *